(12) United States Patent
Trotta et al.

(10) Patent No.: US 11,009,834 B2
(45) Date of Patent: May 18, 2021

(54) DIAMOND-POLISHED APPLIQUE FOR HOROLOGY

(71) Applicant: Nivarox-FAR S.A., Le Locle (CH)

(72) Inventors: Carmelo Trotta, Le Locle (CH); Frederic Haefeli, Tramelan (CH)

(73) Assignee: Nivarox-FAR S.A., Le Locle (CH)

( * ) Notice: Subject to any disclaimer, the term of this patent is extended or adjusted under 35 U.S.C. 154(b) by 135 days.

(21) Appl. No.: 16/271,911

(22) Filed: Feb. 11, 2019

(65) Prior Publication Data

US 2019/0278229 A1  Sep. 12, 2019

(30) Foreign Application Priority Data

Mar. 6, 2018 (EP) ..................................... 18160213

(51) Int. Cl.
*G04D 3/00* (2006.01)
*G04B 19/06* (2006.01)
(Continued)

(52) U.S. Cl.
CPC ............. *G04D 3/0092* (2013.01); *B21H 3/06* (2013.01); *B23Q 3/061* (2013.01); *B24B 1/00* (2013.01);
(Continued)

(58) Field of Classification Search
CPC ...... G04B 19/103; G04B 19/06; G04B 19/10; G04B 19/12; G04D 3/0051; G04D 3/00;
(Continued)

(56) References Cited

U.S. PATENT DOCUMENTS 3,146,578 A * 9/1964 Etienne .................. G04B 19/10
368/226
3,287,798 A * 11/1966 Beyeler ................ B23Q 39/042
29/896.32
(Continued)

FOREIGN PATENT DOCUMENTS

CH  712 210 A2  9/2017
EP  1 557 729 A1  7/2005
(Continued)

OTHER PUBLICATIONS

Combined Chinese Office Action and Search Report dated Aug. 12, 2020, in Patent Application No. 201910116921.7 (with English translation), 11 pages.
(Continued)

*Primary Examiner* — Lawrence Averick
(74) *Attorney, Agent, or Firm* — Oblon, McClelland, Maier & Neustadt, L.L.P.

(57) ABSTRACT

A method for fabricating an applique for horology including a visible upper surface, and a lower surface from which protrudes at least one securing foot: a rough piece is made as a straight workpiece; this rough piece is deformed to form a blank so as to form an upper curve; this blank including this feet is machined; this blank is mounted on a tool having a support surface complementary to the lower surface of this blank, a recess for housing each foot, gripping means and/or an adhesive for securing each blank; the upper curve of this blank is machined with at least one final diamond-polishing operation to form this upper surface.

17 Claims, 2 Drawing Sheets

(51) Int. Cl.
  *G04D 3/02* (2006.01)
  *G04B 19/12* (2006.01)
  *B21H 3/06* (2006.01)
  *B24B 1/00* (2006.01)
  *B24B 41/06* (2012.01)
  *B23Q 3/06* (2006.01)

(52) U.S. Cl.
  CPC ............ *B24B 41/067* (2013.01); *G04B 19/06* (2013.01); *G04B 19/12* (2013.01); *G04D 3/02* (2013.01)

(58) Field of Classification Search
  CPC ...... G04D 3/0092; G04D 3/02; G04D 1/0021; G04D 1/0092; Y10T 29/49583; Y10T 29/49995; B23P 13/00; B23P 13/04; B23P 15/00; B24B 41/06; B24B 27/0023; B24B 37/27; B21H 3/06
  See application file for complete search history.

(56) References Cited

U.S. PATENT DOCUMENTS

| | | | | |
|---|---|---|---|---|
| 3,323,396 A * | 6/1967 | Kochli | ................ | G04B 19/103 82/173 |
| 4,205,989 A * | 6/1980 | Moriya | ................ | G03F 1/54 430/167 |
| 4,584,039 A * | 4/1986 | Shea | ................ | H05K 3/205 156/150 |
| 4,869,760 A * | 9/1989 | Matsunami | ................ | C25D 1/00 156/151 |
| 7,337,542 B2 * | 3/2008 | Brazin | ................ | G04B 19/103 29/896.32 |
| 10,474,105 B2 * | 11/2019 | Charbon | ................ | G04B 19/10 |
| 10,766,689 B2 * | 9/2020 | Buhler | ................ | G04D 1/066 |
| 2005/0160574 A1 * | 7/2005 | Bazin | ................ | G04B 19/103 29/557 |
| 2017/0261936 A1 * | 9/2017 | Charbon | ................ | G04D 3/0043 |
| 2018/0170660 A1 * | 6/2018 | Buhler | ................ | B65D 1/36 |

FOREIGN PATENT DOCUMENTS

| | | |
|---|---|---|
| EP | 1 557 729 B1 | 7/2005 |
| EP | 2 455 824 A1 | 5/2012 |
| EP | 2 455 824 B1 | 5/2012 |

OTHER PUBLICATIONS

European Search Report dated Aug. 30, 2018 in European Application 18160213.7 filed on Mar. 6, 2018 (with English Translation of Categories of Cited Documents).

* cited by examiner

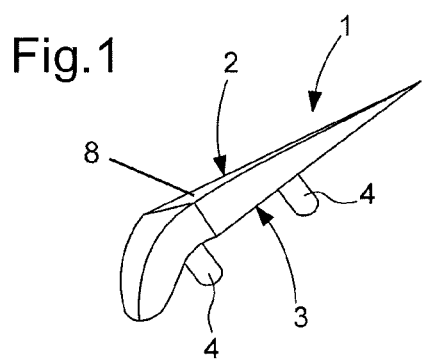
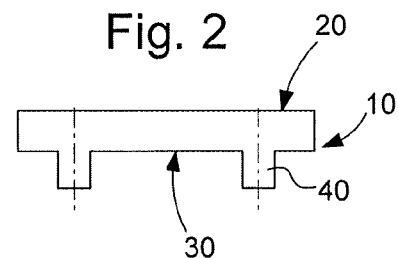
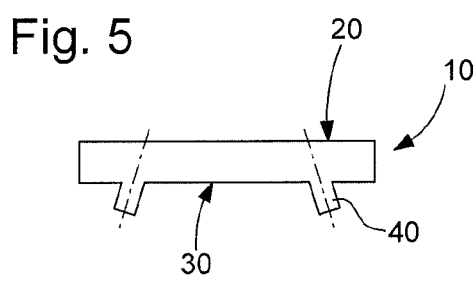
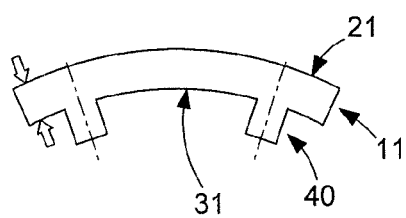
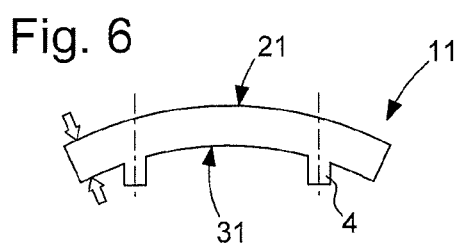
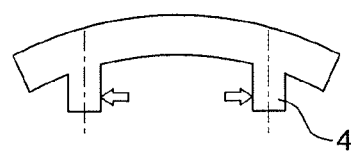
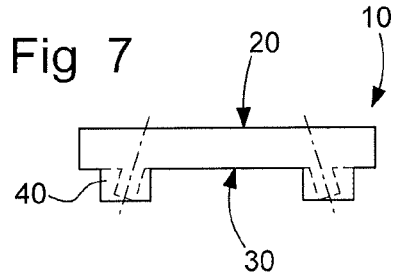
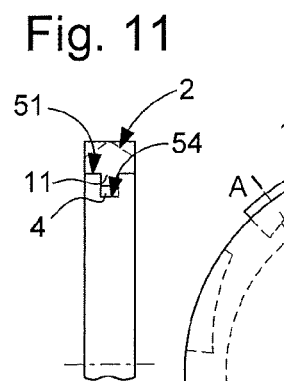
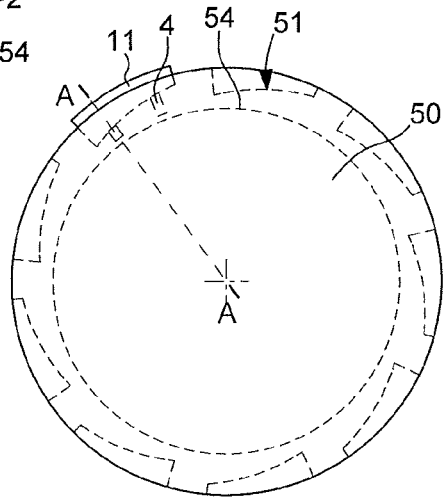
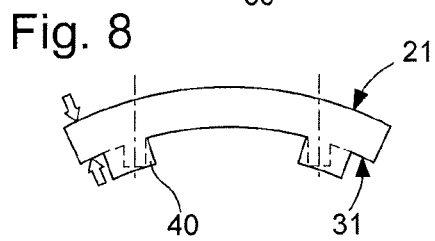
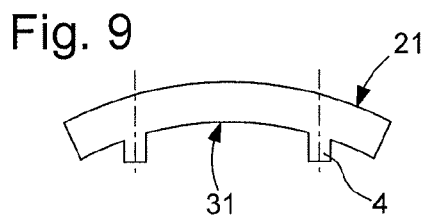

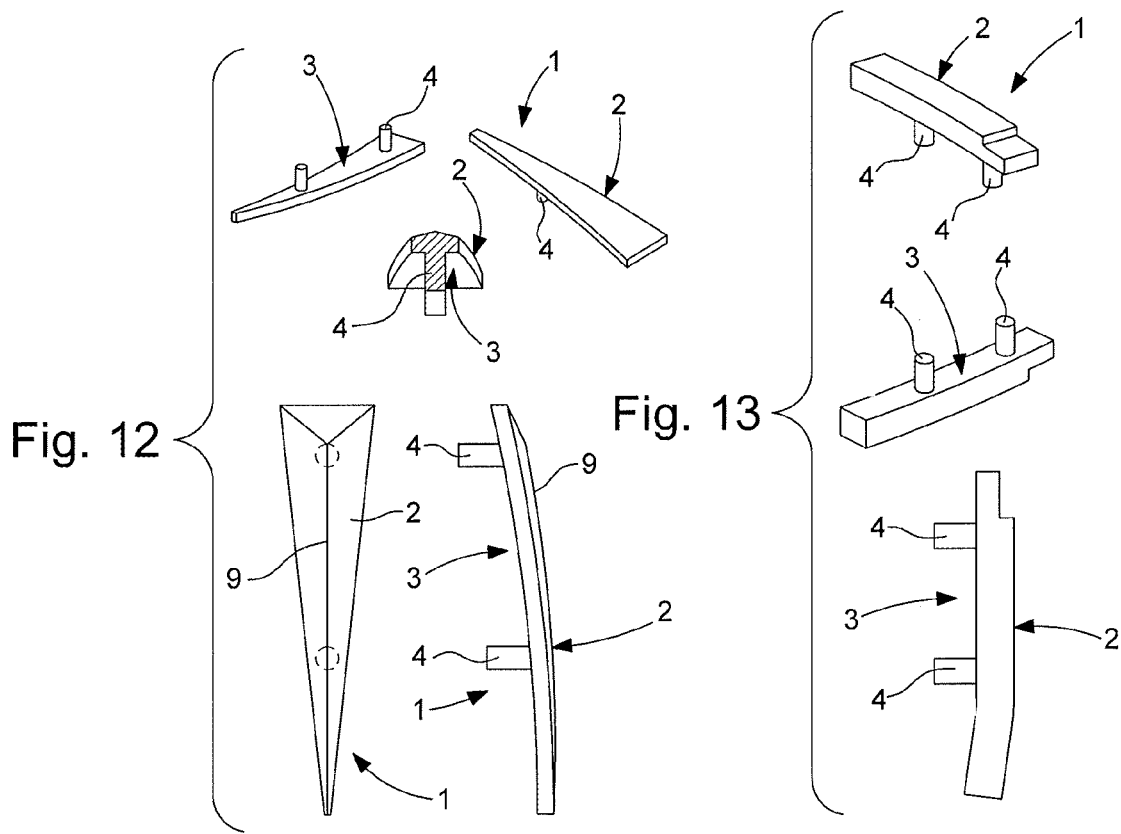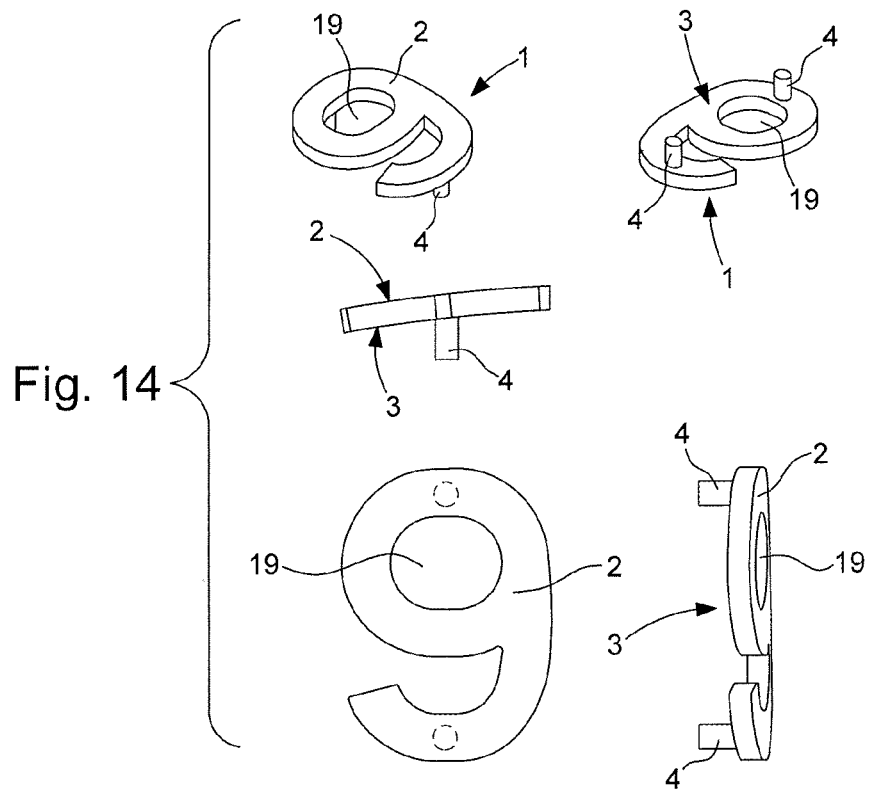

DIAMOND-POLISHED APPLIQUE FOR HOROLOGY

CROSS-REFERENCE TO RELATED APPLICATION

This application claims priority to European Patent Application No. 18160213.7 filed on Mar. 6, 2018, the entire disclosure of which is hereby incorporated herein by reference.

FIELD OF THE INVENTION

The invention concerns a method for fabricating an applique for horology, comprising an upper surface intended to be seen by a user, and a lower surface for resting on a dial or a structure of a timepiece, and at least one foot protruding from said lower surface, comprising a series of steps wherein first a rough piece is made in the form of a straight workpiece with a substantially flat lower surface from which projects a protuberance for forming each said foot, on the opposite side from a top of said rough piece, then a blank is made with at least the machining of each said foot, then said blank is mounted on at least one tool having at least one support surface complementary to said lower surface of said blank, said tool further including at least one recess for housing each said foot, said tool further including gripping means and/or an adhesive for securing each said blank, and then the upper portion of said blank is machined again with at least a final diamond polishing operation to form said upper surface.

The invention also concerns a watch including at least one applique made according to this method.

The invention also concerns a timepiece including at least one such dial and or a structure carrying at least one applique made by the method.

The invention also concerns a timepiece, especially a watch, including at least one applique made according to this method.

BACKGROUND OF THE INVENTION

Timepiece appliques are essential elements of a timepiece, in particular of a watch, helping to give it a specific look. Consequently, they must be very carefully made, very reproducible and free from any surface finish defects. Perfect workmanship is made difficult by the very small size of these decorative components and by the difficulty in gripping them. Consequently, the scrap rate may be high. Fabrication is even more complex when the appliques are bent or curved, to adapt to the curve of a dial, a flange, or a plate, and have no flat reference surface. In the case of curved dials, it is known to form symbols by transfer, or to make very thin appliques curved directly onto the dial. It is clear that, in both cases, the finished look is mediocre. If a diamond-polished applique is made and it is curved or bent (for a curved applique) after diamond-polishing, this spoils its appearance, with orange peel and/or cracks appearing at the surface, which is unacceptable.

EP Patent Application No 1557729A1 in the name of NIVAROX discloses a method for fabricating hour-symbols with feet, allowing the base of said symbols to be fixed on a dial, from a metal profile, including the steps consisting of, in a first step, milling the feet in one end of the profile and roughly shaping the profile; in a second step, gripping the feet in a clamp and cutting out a blank; and in a third step, finishing the blank in the desired shape of the symbol and performing a diamond-polishing operation on all the visible surfaces.

SUMMARY OF THE INVENTION

The invention proposes to define an applique fabrication method ensuring a perfect surface condition of the visible parts.

To this end, the invention concerns an applique fabrication method according to claim 1.

The invention also concerns a watch including at least one applique made according to this method.

BRIEF DESCRIPTION OF THE DRAWINGS

Other features and advantages of the invention will appear from reading the following detailed description, with reference to the annexed drawings, in which:

FIG. 1 represents a schematic, perspective view of an applique made by the method of the invention, which is a curved applique comprising two feet under its lower surface, and facets on its upper surface.

FIG. 2 represents a schematic, side view of a rough piece serving as raw material for the invention, which is a substantially straight workpiece, and which has a substantially flat underside surface, from which protrudes a protuberance for making each foot, on the opposite side to a top of said rough piece.

FIG. 3 represents, in a similar manner to FIG. 2, a blank made by deforming this rough piece.

FIG. 4 represents, in a similar manner to FIG. 3, the same blank transformed by straightening the lower protuberances to form parallel feet.

FIG. 5 represents, in a similar manner to FIG. 2, another rough piece variant, including divergent lower protuberances.

FIG. 6 represents, in a similar manner to FIG. 3, a blank made by deforming the rough piece of FIG. 5, whose feet are parallel simply because the rough piece has been deformed.

FIG. 7 represents, in a similar manner to FIG. 2, yet another rough piece variant, including lower protuberances intended to be re-machined.

FIG. 8 shows, in a similar manner to FIG. 3, a blank made by deforming the rough piece of FIG. 7.

FIG. 9 represents, in a similar manner to FIG. 4 the blank of FIG. 8 transformed by re-machining its lower protuberances to form parallel feet.

FIG. 10 represents a schematic, side view of a tool designed to carry several such blanks, only one of which is represented mounted in position, to transform them into appliques that are immediately usable once the finished upper surface has been machined and diamond-polished.

FIG. 11 is a cross-section of the tool of FIG. 10 carrying such a blank.

FIG. 12 comprises two perspective views from above and below, a top view and a side view, and an intermediate transverse cross-section, of a curved applique made according to the invention, whose lower surface is curved, and the joining edge of two large upper facets symmetrical with respect to a plane through this edge and which also includes a front, upper facet.

FIG. 13 comprises two perspective views seen from above and below, and a side view, of a curved applique made according to the invention comprising flat facets.

FIG. 14 comprises two perspective views, seen from above and below, a top view and two side views in perpendicular directions, of an applique forming a numeral, made according to the invention.

DETAILED DESCRIPTION OF PREFERRED EMBODIMENTS

The invention concerns a method for fabricating a timepiece applique 1.

An 'applique' means any display or decorative element intended to be seen by a user, such as a sign, hour-symbol, numeral, logo, monogram or suchlike, placed on an object, especially a dial, a flange, a plate, a bridge, or suchlike.

Such an applique 1 normally has an upper surface 2 intended to be seen by a user, and a lower surface 3 for resting on a dial or a structure of a timepiece.

If this lower surface 3 can be bonded straight onto such a dial or such a structure it generally has at least one foot 4. Each foot 4 protrudes from this lower surface 3, and more particularly but not exclusively in a particular orientation in space with respect to lower surface 3, in order to be secured to such a dial or such a structure.

To fabricate such an applique 1, the following steps are performed in succession:

a rough piece 10 is first made in the form of a straight workpiece with a substantially flat lower surface 30, from which a protuberance 40 projects to form each foot 4, on the opposite side from a top 20 of rough piece 10;

then a blank 11 is made, with at least the machining of each foot 4;

then this blank 11 is mounted on at least one tool 50 including at least one bearing surface 51 complementary to the lower surface of blank 11, this tool 50 further including at least one recess 54 for housing each foot 4, and especially but not exclusively in its specific orientation; tool 50 also includes gripping means and/or an adhesive for securing each blank 11;

and then the upper part of blank 11 is machined, with at least one final diamond-polishing operation to form upper surface 2.

Although it is evidently possible to make a single protuberance 40 to form several feet 4, the Figures illustrate a preferred embodiment wherein protuberance 40 corresponds to a single foot 4, since this design allows the blank to be easily made by deformation, as illustrated in FIGS. 3, 6 and 8.

The re-machining of blank 11 once feet 4 are made can be split into several operations, performed either on a multi-purpose single tool 50 or on a plurality of tools 50, each specific to a particular surface machining operation.

Likewise, the diamond finishing of the upper portion of blank 11 by diamond polishing to form the finished upper surface 2 may be performed, depending on the case, on a single tool 50, or on a plurality of tools 50 each specific to a particular surface machining operation.

More particularly according to a particular feature of the invention, when blank 11 is made, or after blank 11 is formed, at least one foot 4 is made by machining and/or straightening protuberance 40 from which foot 4 is formed. More particularly still, when blank 11 is made or after blank 11 is formed, each foot 4 is made by machining and/or straightening each protuberance 40. More particularly still, all of feet 4 are made before blank 11 is mounted on tool 50, each recess 54 of which is arranged to receive at least one foot 4 or has a complementary shape to at least one foot 4. It is understood that the same recess 54 can serve as housing for several feet 4 of a same blank 11, or all of feet 4 of a same blank 11, or at least one recess 54 can be reserved for housing a particular foot 4. Naturally, each recess 54 is arranged to allow insertion of each foot and can include an oblong hole or similar for insertion of a foot 4 that is inclined with respect to another foot 4 of the same blank 11. The case of a recess 54 of completely complementary shape to a foot 4 is thus a specific case. Making a recess 54 in the form of an oblong groove delimited by at least one stop surface generally offers both good positioning and good retention of the blank.

According to the invention, once rough piece 10 is made, this rough piece 10 is deformed to form blank 11, so as to form an upper curve 21 resulting from the deformation of top 20 of rough piece 10. Further, on at least one tool 50, this upper curve 21 is re-machined with at least one final diamond-polishing operation to form the finished upper surface 2.

Naturally, upper surface 2 may be complex and include several basic surfaces 6, such as flat facets, bent or curved surfaces, particularly in a toroid portion, portion of a sphere, or otherwise, and it is clear that, depending on the geometry of this upper surface 2 and the basic surfaces that it comprises, it may to necessary to implement:

a multi-axis machining means, for example a machining centre or a grinding machine with 5 or 6 axes, including at least one diamond-polishing tool, and/or a plurality of tools 50 each adapted for spatial presentation of particular surfaces for the machining thereof by the machining means used.

The machining operations may implement various technologies, which may or not be combined, and not exclusively: milling, straightening, electroerosion, laser or otherwise.

According to a particular feature of the invention, the machining and/or diamond-polishing of upper surface 2 is performed with a machining and/or diamond-polishing unit movable along at least 5 axes with respect to each blank 11.

More particularly, in order to form an upper surface 2 with plane symmetry on either side of a main edge 9 defining a plane of symmetry P, according to a particular feature of the invention, at least one tool 50 is made wherein each support surface 51 is disposed such that plane of symmetry P is perpendicular to an axis of rotation D about which tool 50 is rotatable.

In particular, and as illustrated by FIGS. 10 and 11, this tool 50 is a polishing head arranged to be driven in rotation opposite one or more machining means, and able to receive a plurality of blanks 11, each inserted into a particular housing, or all inserted into a peripheral groove 54 arranged for housing feet 4. FIG. 10 shows a particular case with shaped housings, arranged to give a specific angular orientation to each blank 11. It is also possible, very simply, to make this polishing head with a peripheral groove with no lower support for feet 4 and/or the lower face of blank 11.

More specifically, at least one such tool 50 is made with each support surface 51 disposed such that at least one portion of said upper surface 2 is concentric to an axis of rotation D about which tool 50 is rotatable.

The diamond polishing tool can be driven on a multi-axis trajectory or follow a cam to make a non-circular motion.

In particular, to form an upper surface 2 resulting from the juxtaposition of basic surfaces 6, at least one of which is a basic surface with symmetry of revolution, a tool 50 is made for forming each basic surface with symmetry of revolution, wherein each said support surface 51 is disposed such that this basic surface with symmetry of revolution is concentric to an axis of rotation D about which tool 50 is rotatable.

More specifically, to form an upper surface 2 with symmetry of revolution, a single tool 50 is made, with each support surface 51 disposed such that the whole of upper surface 2 is concentric to an axis of rotation D about which tool 50 is rotatable.

In the particular case of forming an upper surface 2 resulting from the juxtaposition of basic surfaces 6, at least one of which is a flat basic surface 8, advantageously at least one tool 50 is made for forming a flat, basic surface 8, wherein each support surface 51 is disposed such that flat basic surface 8 is parallel to an axis of rotation D about which tool 50 is rotatable.

Advantageously, when the geometry of the upper surface and the machining means selected allow, all the machining of upper curve 21 is performed to form said upper surface 2 without removing blank 11 from a single tool 50.

If necessary, the machining of upper curve 21 is broken down to form upper surface 2 using a plurality of tools 50 on which each blank 11 is mounted in succession.

According to a particular feature of the invention, at least one tool 50 is made with angular indexing means for positioning each blank 11 with respect to tool 50, and for the spatial positioning of the machining and/or diamond polishing means with respect to each blank 11 mounted on tool 50.

To make appliques 1 of a particular shape, such as numerals, or logos, or suchlike, rough piece 10 is made in the form of a numeral or symbol with a bead extending around at least one opening 19 comprised in the numeral or symbol, this bead including lower surface 30 which carries a protuberance 40 for making each foot 4.

In the particular case of hollow appliques 1, rough piece 10 is made hollow with substantially flat lower surface 30 limited to a peripheral support edge, which carries a protuberance 40 for making each foot 4, and/or which surrounds a pocket from which such a protuberance 40 protrudes to form at least one foot 4.

In the case of solid appliques 1, rough piece 10 is made solid, with substantially flat lower surface 30 devoid of a pocket, and which carries a protuberance 40 for forming each foot 4.

A particular implementation of the method according to the invention concerns curved or bent appliques, whose lower surface 3 is bent or curved for resting on a dial or a structure of a timepiece. In this particular case, an applique 1 is made with a curved and/or bent lower surface 3, and the following steps are performed in succession:

a rough piece 10 is first made in the form of a straight workpiece with a substantially flat lower surface 30, from which a protuberance 40 projects to form each foot 4, on the opposite side from a top 20 of rough piece 10;

then rough piece 10 is deformed to form a blank 11 having a lower curve 31 which includes at least one portion of lower curved surface 3, said blank 11 having an upper curve 21 resulting from the deformation of top 20, then blank 11 is mounted on at least one tool 50 including at least one support surface 51 complementary to at least one portion of said curved lower surface 3 or to lower curve 31, tool 50 further comprising at least one recess 54 for housing each protuberance 40 or each foot 4 when protuberance 40 is identical to foot 4, and especially but not exclusively in its specific orientation; tool 50 also including gripping means and/or an adhesive for securing each blank 11, and then upper curve 21 is machined with at least one final diamond-polishing operation to form upper surface 2.

More particularly, lower curve 31 is made forming the whole of curved lower surface 3.

In particular, said rough piece 10 is made of precious material, or assayed material, especially gold or gold alloy, or platinum, or platinum alloy, or suchlike.

The invention also concerns a watch including at least one applique made according to this method.

The invention claimed is:

1. A method for fabricating an applique for horology, comprising an upper surface intended to be seen by a user, and a lower surface for resting on a dial or a structure of a timepiece, and at least one foot protruding from said lower surface, comprising a series of steps wherein first a rough piece is made in the form of a straight workpiece with a flat lower surface from which projects a protuberance for forming each said foot, on the opposite side from a top of said rough piece, then a blank is made with at least a machining of each said foot, then said blank is mounted on at least one tool having at least one support surface complementary to the lower surface of said blank, said tool further including at least one recess for housing each said foot, said tool further including a gripping means and/or an adhesive for securing each said blank, and then the upper portion of said blank is machined with at least one final diamond-polishing operation to form said upper surface, wherein, once rough piece is made, said rough piece is deformed to form said blank so as to form an upper curve resulting from the deformation of said top, and wherein, on said tool, said upper curve is re-machined with at least one final diamond-polishing operation to form said upper surface.

2. The method for fabricating an applique for horology according to claim 1, wherein, when said blank is made or formed, at least one said foot is made by machining and/or straightening said protuberance from which said foot is formed.

3. The method for fabricating an applique for horology according to claim 2, wherein, when said blank is made or formed, each said foot is made by machining and/or straightening said protuberance from which said foot is formed.

4. The method for fabricating an applique for horology according to claim 2, wherein all of said feet are made before said blank is mounted on said tool, each said recess of the tool is arranged to receive at least one said foot or has a complementary shape to at least one said foot.

5. The method for fabricating an applique for horology according to claim 1, for forming said upper surface with plane symmetry on either side of a main edge defining a plane of symmetry, wherein at least one said tool is made wherein each said support surface is disposed such that said plane of symmetry is perpendicular to an axis of rotation about which said tool is rotatable.

6. The method for fabricating an applique for horology according to claim 1, for forming said upper surface resulting from the juxtaposition of basic surfaces, at least one of which is a flat basic surface, wherein at least one said tool is made for forming the flat basic surface, wherein each said support surface is disposed such that said flat basic surface is parallel to an axis of rotation about which said tool is rotatable.

7. The method for fabricating an applique for horology according to claim 1, wherein all of the machining of said upper curve is performed to form said upper surface without removing said blank from a single tool.

8. The method for fabricating an applique for horology according to claim 1, wherein the machining of said upper curve is broken down to form said upper surface by using a plurality of said tools on which said blank is successively mounted.

9. The method for fabricating an applique for horology according to claim 1, wherein at least one said tool is made including angular indexing means for positioning each said blank with respect to said tool, and for the spatial positioning of the machining and/or diamond polishing means with respect to each said blank mounted on said tool.

10. The method for fabricating an applique for horology according to claim 1, wherein said machining and/or said diamond polishing of said upper surface is performed with a machining and/or diamond polishing unit movable on 5 axes with respect to each said blank.

11. The method for fabricating an applique for horology according to claim 1, wherein said rough piece is made in the form of a numeral or symbol with a bead extending around at least one opening comprised in said numeral or symbol, said bead including said lower surface which carries said protuberance for forming each said foot.

12. The method for fabricating an applique for horology according to claim 1, wherein said rough piece is made hollow, with said flat lower surface limited to a peripheral support edge, which carries the protuberance for making each said foot, and/or which surrounds a pocket from which said protuberance protrudes to form at least one said foot.

13. The method for fabricating an applique for horology according to claim 1, wherein said rough piece is made solid, with said flat lower surface devoid of a pocket and which carries said protuberance for forming each said foot.

14. The method for fabricating an applique for horology according to claim 1, wherein said applique is made comprising a curved and/or bent lower surface for resting on a dial or a structure of a timepiece, and wherein the following steps are performed in succession, wherein first a rough piece is made in the form of a straight workpiece with a flat lower surface from which projects a protuberance for forming each said foot, on the opposite side from a top comprised in said rough piece, then said rough piece is deformed to form a blank having a lower curve which includes at least one portion of said curved lower surface, said blank having an upper curve resulting from the deformation of said top, then said blank is mounted on the at least one tool including at least one support surface complementary to said at least one portion of said curved lower surface or to said lower curve, said tool further comprising at least one recess for housing each said protuberance or each said foot when said protuberance is identical to said foot, said tool further including a gripping means and/or an adhesive for securing each said blank, and then said upper curve is machined with at least one final diamond polishing operation to form said upper surface.

15. The method for fabricating an applique for horology according to claim 14, wherein said lower curve is made forming the whole of said curved lower surface.

16. The method for fabricating an applique for horology according to claim 1, wherein said rough piece is made of assayed material.

17. A watch comprising at least one applique made according to the method of claim 1.

* * * * *